United States Patent
Pickholz et al.

(10) Patent No.: US 12,124,056 B2
(45) Date of Patent: *Oct. 22, 2024

(54) UNITARY MULTI-OPTIC SYSTEMS WITH OPTICAL BARRIERS

(71) Applicant: MagWerks Vision Inc., Oxford, MI (US)

(72) Inventors: Michael F. Pickholz, Oxford, MI (US); Steven Francis Tregilgas, Oxford, MI (US)

(73) Assignee: MagWerks Vision Inc., Oxford, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,949

(22) Filed: Oct. 13, 2023

(65) Prior Publication Data

US 2024/0045112 A1 Feb. 8, 2024

Related U.S. Application Data

(63) Continuation of application No. 17/363,473, filed on Jun. 30, 2021, now Pat. No. 11,815,701.

(Continued)

(51) Int. Cl.
| | |
|---|---|
| *G02B 3/00* | (2006.01) |
| *F21S 41/143* | (2018.01) |
| *F21S 41/26* | (2018.01) |
| *F21S 41/32* | (2018.01) |
| *F21S 43/31* | (2018.01) |
| *F21V 7/00* | (2006.01) |

(52) U.S. Cl.
CPC .......... *G02B 3/0031* (2013.01); *F21S 41/143* (2018.01); *F21S 41/26* (2018.01); *F21S 41/32* (2018.01); *F21S 41/322* (2018.01); *F21S 43/315* (2018.01); *F21V 7/0091* (2013.01); *G02B 3/0056* (2013.01)

(58) Field of Classification Search
CPC ... G02B 3/0031; G02B 3/0056; F21S 41/265; F21S 41/26
See application file for complete search history.

(56) References Cited

U.S. PATENT DOCUMENTS

| | | |
|---|---|---|
| 1,212,174 A | 1/1917 | Beiswanger |
| 1,399,973 A | 12/1921 | Limpert |

(Continued)

FOREIGN PATENT DOCUMENTS

| | | |
|---|---|---|
| CA | 738085 A | 7/1966 |
| CA | 2738085 A1 | 11/2011 |

(Continued)

*Primary Examiner* — Christopher E Dunay
(74) *Attorney, Agent, or Firm* — Young Basile Hanlon & MacFarlane, P.C.

(57) ABSTRACT

A unitary multi-optic system for a vehicle having two or more co-molded individual optics molded from optical silicone such that each individual optic is adjacent at least one other individual optic, each individual optic configured to be illuminated with a respective radiation source. An optical-blocking barrier is integrally molded with the individual optics and configured to interfere with transmission of undesired source emissions between the two or more co-molded individual optics. The two or more co-molded individual optics are headlamps or tail lamps of the vehicle.

18 Claims, 7 Drawing Sheets

Related U.S. Application Data

(60) Provisional application No. 63/047,367, filed on Jul. 2, 2020.

(56) References Cited

U.S. PATENT DOCUMENTS

| | | | |
|---|---|---|---|
| 1,478,473 | A | 12/1923 | Herron |
| 2,700,098 | A | 1/1955 | Hendri |
| 5,926,320 | A | 7/1999 | Parkyn, Jr. et al. |
| 7,118,236 | B2 | 10/2006 | Hahm et al. |
| 7,300,185 | B1 | 11/2007 | Ruffin et al. |
| 7,686,481 | B1 | 3/2010 | Condon et al. |
| 7,712,931 | B1 | 5/2010 | Smith |
| 8,215,814 | B2 | 7/2012 | Marcoux |
| 8,303,141 | B2 | 11/2012 | Jiang |
| 8,337,054 | B2 | 12/2012 | Bernard |
| 8,858,022 | B2 | 10/2014 | Jiang et al. |
| 9,409,512 | B2 | 8/2016 | Stein et al. |
| 9,423,096 | B2 | 8/2016 | Wilcox et al. |
| 9,459,436 | B2 | 10/2016 | Smith |
| 9,638,852 | B2 | 5/2017 | Sakai |
| 10,253,940 | B1 | 4/2019 | Shih |
| 10,619,817 | B2 | 4/2020 | Koons et al. |
| 10,761,243 | B1 | 9/2020 | Wei |
| 11,079,628 | B2 | 8/2021 | Yamada et al. |
| 2003/0156417 | A1 | 8/2003 | Gasquet et al. |
| 2006/0056086 | A1 | 3/2006 | Hannah |
| 2006/0061999 | A1 | 3/2006 | Sommers et al. |
| 2006/0104077 | A1* | 5/2006 | Oshio ................ F21S 41/143 362/547 |
| 2009/0086498 | A1 | 4/2009 | Condon et al. |
| 2011/0249462 | A1 | 10/2011 | Koizumi et al. |
| 2013/0314925 | A1 | 11/2013 | Jiang et al. |
| 2014/0204588 | A1 | 7/2014 | Ha et al. |
| 2014/0218950 | A1 | 8/2014 | Kim et al. |
| 2015/0345747 | A1 | 12/2015 | Castillo |
| 2016/0312977 | A1 | 10/2016 | Jiang et al. |
| 2017/0321859 | A1 | 11/2017 | Zawacki |
| 2018/0017225 | A1 | 1/2018 | Salter et al. |
| 2018/0372302 | A1 | 12/2018 | Orbe |
| 2019/0017692 | A1 | 1/2019 | Dinant et al. |
| 2019/0072256 | A1 | 3/2019 | Shih |
| 2019/0128501 | A1 | 5/2019 | Chen et al. |
| 2019/0383480 | A1 | 12/2019 | Williams et al. |
| 2020/0072428 | A1 | 3/2020 | Simchak et al. |
| 2020/0080717 | A1 | 3/2020 | Williams et al. |
| 2020/0182428 | A1 | 6/2020 | Antonipieri et al. |
| 2020/0408380 | A1* | 12/2020 | Muegge ................ F21S 43/50 |
| 2021/0053481 | A1* | 2/2021 | Koerdt ................ G02B 6/0008 |
| 2022/0034470 | A1* | 2/2022 | Chen ..................... F21S 41/27 |
| 2022/0170607 | A1* | 6/2022 | Mukojima ........... F21S 41/151 |

FOREIGN PATENT DOCUMENTS

| | | |
|---|---|---|
| CN | 207112692 U | 3/2018 |
| DE | 202017104684 U1 | 1/2018 |
| DE | 102017127977 A1 | 5/2018 |
| DE | 102017213100 A1 | 1/2019 |
| FR | 2867257 A1 | 9/2005 |
| KR | 101622734 B1 | 5/2016 |
| WO | 2010054956 A1 | 5/2010 |
| WO | 2015110392 A1 | 7/2015 |
| WO | 2020021825 A1 | 1/2020 |
| WO | 2020-109652 A1 | 6/2020 |

* cited by examiner

SECTION B - B

UNITARY MULTI-OPTIC SYSTEMS WITH OPTICAL BARRIERS

CROSS-REFERENCE TO RELATED APPLICATION(S)

This application is a continuation application of U.S. patent application Ser. No. 17/363,473, filed Jun. 30, 2021, which claims priority to and the benefit of U.S. Provisional Patent Application Ser. No. 63/047,367, filed Jul. 2, 2020, the entire disclosures of which are hereby incorporated by reference.

TECHNICAL FIELD

This disclosure relates to the field of lamps utilized for illumination, signalization and/or broadcast of light energy, employing optical systems to harness and direct the optical output of LEDs, laser-based light sources, light bulbs, High Intensity Discharge (HID) lights and/or any other source producing light output, whether in the visible or non-visible spectra, towards a defined area and/or pattern.

BACKGROUND

Optical lenses engineered to harness and direct sources of light are produced with basic techniques devised to tailor light output. Since the 1980's, plastic lenses have steadily replaced glass as the transparent outer enclosure for lighting applications in most fields. Historically, plastic lenses have been produced from rigid materials, such as, but not limited to, polycarbonate (PC), poly(methyl methacrylate) (PMMA), polystyrene (PS), cyclic olefin polymer (COP), cyclic olefin copolymer (COCP).

These materials are essentially rigid in nature, not substantially deforming under applied pressure or through the force of gravity. Once properly fixed and in place, such materials essentially retain their geometric configuration. However, there are many disadvantages to the use of plastic for optical lenses, particularly in the automotive field.

SUMMARY

Disclosed herein are embodiments of a unitary multi-optic system that enables the use of individual optics each with its own illumination source to be a unitary piece while preventing stray light from adjacent optics. The optical-blocking barriers also act as a structural scaffold to support the co-molded optics when molded from optical silicone.

One embodiment of a unitary multi-optic system as disclosed herein has two or more co-molded individual optics molded such that each individual optic is adjacent at least one other individual optic, each individual optic configured to be illuminated with a respective individual radiation source. An optical-blocking barrier is integrally molded with the individual optics and configured to prevent transmission of undesired source emissions between the two or more co-molded individual optics.

Another embodiment of a unitary multi-optic system is for a vehicle and has two or more co-molded individual optics molded such that each individual optic is adjacent at least one other individual optic, each individual optic configured to be illuminated with a respective individual radiation source, each individual optic having a respective prescription. An optical-blocking barrier is integrally molded with the individual optics and configured to prevent transmission of undesired source emissions between the two or more co-molded individual optics.

The optical-blocking barrier can be positioned between adjacent individual optics. The optical-blocking barrier can circumscribe each individual optic. The optical-blocking barrier can extend beyond a rear surface or a side surface of a body of one or both of the adjacent individual optics. A heating element can be incorporated.

Another embodiment of a unitary multi-optic system for a vehicle has two or more co-molded individual optics molded from optical silicone such that each individual optic is adjacent at least one other individual optic, each individual optic configured to be illuminated with a respective radiation source. An optical-blocking barrier is integrally molded with the individual optics and configured to interfere with transmission of undesired source emissions between the two or more co-molded individual optics. The two or more co-molded individual optics are headlamps or tail lamps of the vehicle.

The prescriptions can be one of a headlamp, turn signal lamp, low beam lamp, high beam lamp, signal lamp, side lighting lamp and fog lamp, as non-limiting examples.

Also disclosed herein are embodiments of a lamp lens comprising optical silicone molded into a thin lens element configured to be illuminated with one or more illumination source, and a reinforcing grid embedded in the thin lens element, the reinforcing grid imparting structural strength to the thin lens element. The reinforcing grid may also be a heating element or may carry a heating element.

These and other embodiments and aspects are contemplated herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
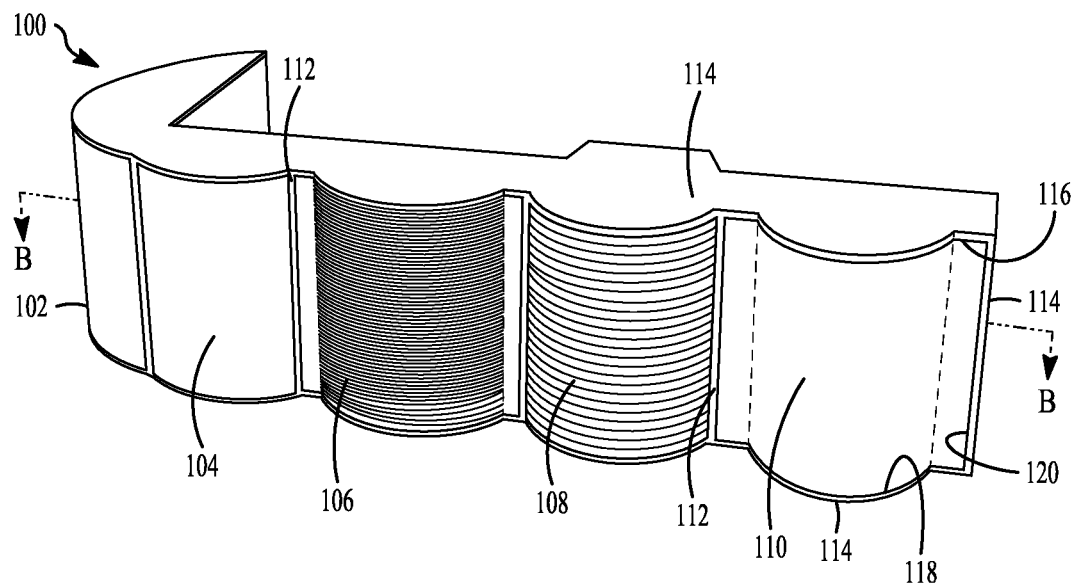
FIG. 1A is a front perspective view of an embodiment of a unitary, multi-optic system having different optical prescriptions as disclosed herein.

Optical prescription lenses are typically individually molded to obtain the desired prescription, and each lens has its own radiation source. When multiple lenses are used in an application, such as an automobile application, the lenses are assembled in a housing and each lens is individually aimed. As a non-limiting example, an optical prescription lens can be formed for headlights or tail lights, with another optical prescription lens formed for fog light and yet another optical prescription lens formed for a turn signal. The optical prescription lenses are typically made of glass or rigid plastic. On systems utilizing individual optical lenses, stray light is usually captured within the lamp and usually prevented from exiting the lamp in an uncontrolled, undesired manner. As used herein "prescription" refers to an optic or a lens that is designed to meet certain specification with regard to light or radiation pattern and intensity.

Co-molding of plastics to form multiple optical lenses as a single unitary array has been employed in some industrial and consumer applications where light "bleeding" between the individual optics is non-critical and can be tolerated. While such unitary arrays achieve sufficient optical efficiency for the industrial and consumer applications, the optical efficiency typically remains under 50%. Stray light from the light source, which is not harnessed by the optical system, will impinge the adjacent optic at odd, undesired angles, thereby creating stray, uncontrolled light as well, further compounding the problem. For multiple applications such as optics, which do not fall under specific regulation or need to meet specific photometric requirements, the issue is largely manageable as well as tolerable.

There is interest in the use of co-molded optical lens arrays in applications such as automotive, where optical regulations have specific specifications, such as regulatory specifications. Co-molded unitary optical lens arrays can reduce the size and the weight of the same array formed with individually molded lenses because the housing requirements are reduced. Furthermore, when different prescription optics are molded in a unitary piece, the mold ensures that the alignment of each prescription optic lens with respect to each other and the overall application is precise producing the specified light output and pattern. The secondary adjustment/alignment that is required with individually molded optic lenses is not needed with the co-molded array. However, co-molding of plastics to form multiple optical lenses as a single unitary array has not been used for regulated optic applications such as automotive applications at least in part due to the issue of stray light. At issue is the optical coupling, which takes place when lenses are conjoined or co-molded into a unitary element comprising multiple optical elements forming an optical system, as light will propagate between one optic and the conjoined/adjacent one in an uncontrolled manner. In co-molded (molded as one) plastic optical lenses, stray light can readily emanate from 1) the radiation (or light) source, 2) the optical system itself, the light existing in an uncontrolled matter, or 3) from one optic lens to adjacent optic lenses through the walls of the co-molded optic lenses in the array. For example, total internal reflection (TIR) optics are not totally efficient in harnessing light, hence light will escape and enter adjacent or adjoining optics thereby creating unintended optical aberrations. Stray light emanating from one optical element and/or source can adversely compromise the performance of an adjacent optical element as stray, uncontrolled light enters an adjacent optical element and propagates, then exits the adjacent optical element in an uncontrolled manner. The stray light can degrade and impair sought after optical performance as well as entail the possibility of failing to achieve specific optical performance requirements. Stray, uncontrolled light is unacceptable or may lead to non-compliance of optical regulation specifications.

Disclosed herein are embodiments of a unitary multi-optic lens comprising co-molded multiple optical elements. Also disclosed is a lamp comprising the unitary multi-optic lens and a radiation source provided in each optical element. The optical elements of the unitary multi-optic lens can all be of the same prescription or can be of different prescriptions. The unitary multi-optic lens also includes an optical-blocking barrier integrally molded with the multiple optical elements, the optical-blocking barrier molded between adjacent optical elements so as to prevent transmission of emissions from the radiation source between the adjacent optical elements. The optical-blocking barrier can also be co-molded at exterior surfaces of the unitary multi-optic lens, including end surfaces and top and bottom surfaces, to prevent transmission of emissions from the radiation source through the outer walls of each optical lens.

FIG. 1A illustrates a unitary multi-optic system molded as a unitary—or monolithic—piece whereby each individual optical prescription addresses a specific individual illumination function whose performance may be adversely impacted by stray light emanating from an adjacent light or radiation source. The unitary multi-optic system is, for illustration, an automotive headlamp system whereby all the various elements are molded as a unitary, co-molded, single piece multi-optic system 100. Each individual prescription, such as the side-emitting light optic 102, the turn signal optic 104, the primary low beam optic 106, the secondary low beam optic 108, and the high beam optic 110, must meet stringent optical output criteria, which otherwise can be adversely compromised by stray, uncontrolled light emanating from one illuminated source, entering an adjacent one, then exiting in a manner which adversely impacts the sought optical objectives and/or optical requirements.

Figure 1B:
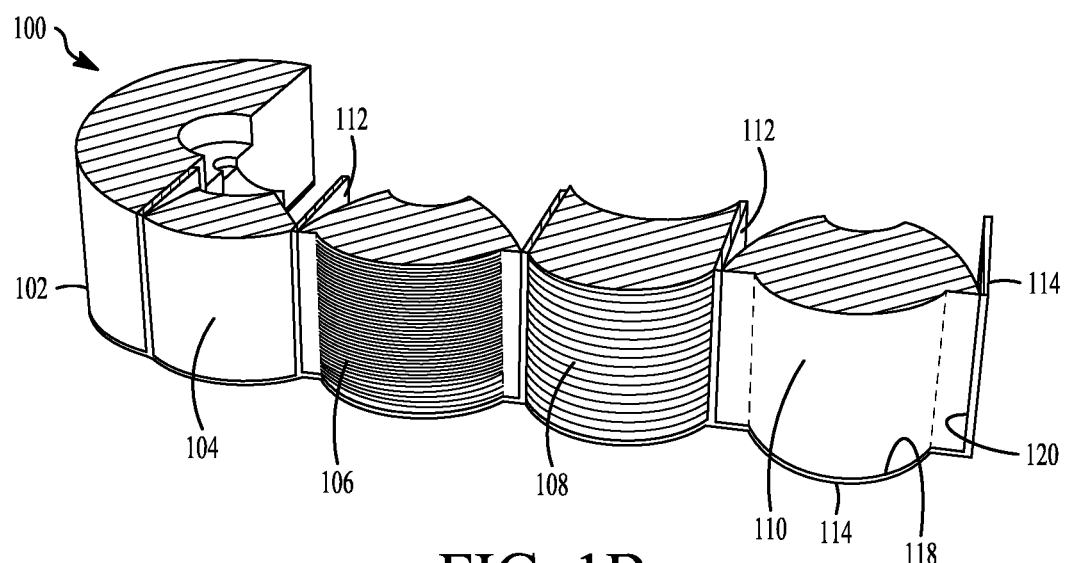
FIG. 1B is a cross-sectional view of FIG. 1A along line B.
Figure 1C:
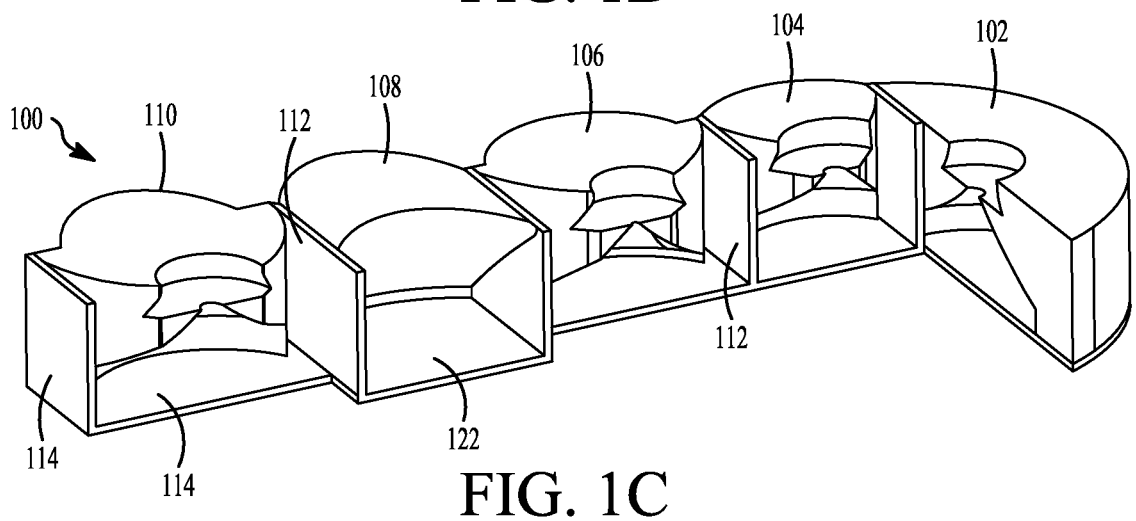
FIG. 1C is a rear perspective view of FIG. 1B.

To eliminate the stray light, enabling the use of co-molded optics for regulated systems such as automotive lamps, the unitary multi-optic system 100 further incorporates optical-blocking barriers 112 co-molded with the optics, the optical-blocking barriers 112 positioned between adjacent optics. Additional optical-blocking barriers 114 may be included on the periphery of the unitary multi-optic system 100, on one or more of the top surface 116, bottom surface, 118 and side surface(s) 120. FIG. 1B is a cross-section view of FIG. 1A along line B. FIG. 1C is a rear view of the cross-section shown in FIG. 1B. As illustrated in FIGS. 1B and 1C, the optical-blocking barriers 112, 114 can extend beyond the surfaces of the optics, beyond the body of the optic itself, to block airborne stray light from the associated light source or any other exterior source. The degree if extension can vary depending on the housing in which the unitary multi-optic system 100 will be held, the application and/or position of the unitary multi-optic system 100, for example. This is illustrated with the optical-blocking barrier 122 associates with the secondary low beam optic 108.

Figure 2A:
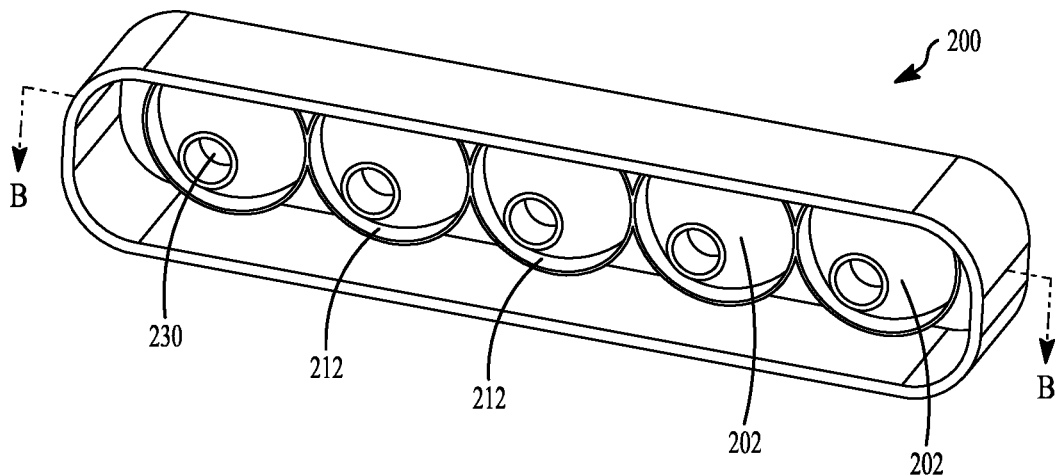
FIG. 2A is a rear perspective view of another embodiment of a unitary, multi-optic system having the same optical prescriptions as disclosed herein.
Figure 2B:
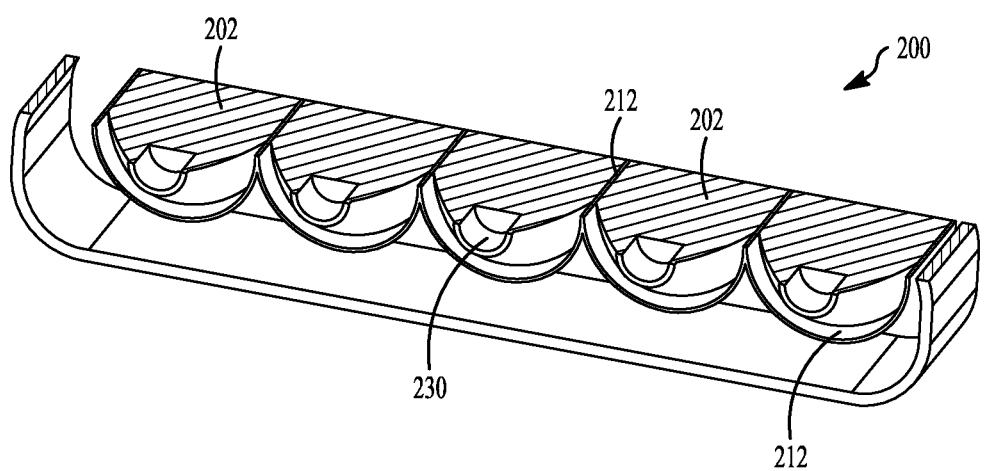
FIG. 2B is a cross-section view of FIG. 2A along line B.

For illustrative purposes, FIG. 2A illustrates a unitary multi-optic system 200 molded as a unitary—or monolithic—piece whereby each individual optic 202 has the same prescription. To eliminate the stray light, enabling the use of co-molded optics for regulated systems such as automotive lamps, the unitary multi-optic system 200 further incorporates optical-blocking barriers 212 co-molded with the optics 202, the optical-blocking barriers 212 in this embodiment positioned between adjacent optics 202 by circumscribing each optic 202. The optical-blocking barrier 212 can completely circumscribe the optic 202 or can partially circumscribe the optic 202 so long as stray light is prevented from contaminating an adjacent optic. The optical-blocking barrier 212 can extend beyond the body of the respective optic 202 as necessary, typically extending beyond one or both of a rear or side surface of the body, and each optical-blocking barrier 212 can individually, selectively extend. FIG. 2B is a cross-section view of FIG. 2A along line B. As with FIGS. 1A-1C, the radiation/light source is not shown, but each optic 202 is illustrated with a receiving portion 230 which would receive the light/radiation from the source or would receive the source itself.

The unitary multi-optic systems 100, 200 will be understood by those skilled in the art to have utility in numerous, various applications, including, without limitation, battery and motor vehicles (including automobiles, trucks, aircraft, watercraft, recreational vehicles, off-road vehicles, and the like), aerospace, and fixed indoor and outdoor lighting applications (e.g., street lighting, parking garage lighting). As already noted, the unitary multi-optic systems 100, 200 can be used in regulated applications such a vehicle exterior lighting. Although illustrated to show one row of optics, any configuration in which multiple optics can be molded together with an optical-blocking barrier between adjacent optics is contemplated. As non-limiting examples, the optics could be stacked one upon another and the optics could be set in multiple rows.

The optic material can be a plastic such as PC, PMMA, PS, COP and COCP, as examples. The optical-blocking barriers 112, 114, 212 can be made from one or more suitable opaque materials, such as an opaque plastic, including but not limited to opaque versions of PC, PMMA, PS, COP, and COCP, an opaque silicone, and stainless steel, low alloy steel, sheet steel, tool steel, titanium, cobalt, copper, magnetic metal, hard-metal, refractory metal, ceramic, magnesium, sheet magnesium, injection molded magnesium, aluminum, sheet aluminum, and/or magnesium/aluminum alloy, brass, and copper, as non-limiting examples. The optical-blocking barriers 112, 114 can be fitted into the unitary mold and molded with the optic material or insert-molded once the optic material is poured. The optical-blocking barriers can be produced through any well-known technique such as, but not limited to, plastic injection molding, stamping, casting or thixomolded magnesium construction. The optical-blocking barriers would be precisely placed inside the unitary optical mold with optic material over-molding the barrier, thereby achieving a unitary lens construction with an integrated set of light blocking partitions within.

As an alternative to plastic, optical silicone can be used as the optic material in the unitary multi-optic systems 100, 200 disclosed herein. Optical silicone provides many advantages over the rigid plastic typically used in lenses.

Common plastic lenses require the application of external anti-UV coatings in order to preclude the degradation of the plastic, which otherwise rapidly turns opaque, greatly reducing the functional performance as well as adversely impacting the appearance of the product. Such products commonly have a limited performance lifespan, leading to often severe optical degradation with extended sunlight (UV) exposure, a clear negative for products frequently or continually exposed to sun. Optical silicone is impervious to UV radiation damage. Optical silicone testing has demonstrated resistance to UV damage in excess of 10 years in direct sun exposure. No anti-UV coating is needed with optical silicone.

Conventional plastic lenses, particularly those used on vehicle exteriors, require hard coatings in order to mitigate the rapid surface degradation brought about by foreign object impingement, occurring, for example, during travel. Optical silicone has an inherent resistance to gravel and other road debris impingement. The soft, rubber-like properties of optical silicone are such that, rather than imbedding and/or damaging the surface of the plastic lenses, the energy is absorbed within the optical silicone without adversely affecting the optical clarity of the material, with the debris simply bouncing-off without imparting physical damage to the optic silicone material.

Plastics used to make lenses shrink while cooling, which leads to the loss of critical optical shape definition as the material pulls away from the desired tool optical geometry. This can be particularly pronounced in large molds, with large optical lens volumes leading to undesirable deformations in other critical optic areas. The industry has sought to address such issues via multi-step molding solutions, whereby lenses are produced via successive molding "steps" thereby accumulating material in subsequent molding operations so as to control shrink and thereby deliver accurate as-molded optical performance. Such processes are inherently expensive, given the multi-shot nature of the molding equipment.

Optical silicone can be molded/formed accurately in a large format optic with no sink or other optical aberrations and in a single mold process. Optical silicone optics are formed with a thermoset process, which utilizes a catalyst along with heat input to cure the optic into its final configuration. Rather than shrink, silicone effectively expands during the molding process, thereby enabling a highly accurate replication of the optical surface, including very thin optical elements in a single molding step.

Yet another advantage of using optical silicone is its significantly higher temperature resistance than other common optical-grade plastics, which make optical silicone particularly useful in LED applications where close proximity between the optical element and the LED source is functionally advantageous. Such close proximity between LEDs and conventional plastic lenses is often precluded due to the thermal degradation brought about by high temperatures on plastic optics, for instance. Silicone optics can thus be placed directly over high temperature LED sources, thereby significantly improving optical performance while precluding damage over time, a critical functional advantage.

Optical silicone is rubber-like in nature. Being both soft as well as flexible, it differs significantly from other forms of optical grade materials, such as glass and rigid plastics, and such flexibility contributes to the advantages already described. This flexibility introduces other advantages as well (e.g., the ability to incorporate flexible elements, the ability to incorporate significant "undercuts", which otherwise would prevent plastics to be removed from the mold without incorporating mold action, the ability to significantly deform yet return to its as-molded shape, having a higher temperature resistance, etc.) Yet, the lack of structural rigidity makes the use of optical silicone impractical or unsuitable for many applications, such as large optics and for thin areas.

The rubber-like nature of optical silicone precludes the direct replacement of rigid plastics in many applications, such as those requiring thin lenses covering a myriad of lighting products, ranging from flashlights to automotive headlamps. While readily moldable, silicone optics molded in conventional plastic lens geometries simply prove too soft as well as deformable, both through direct mechanical input as well as gravity, rendering them unsuitable as direct substitutes for rigid optical plastic materials. While silicone can be molded as a thin lens, the inherent lack of rigidity and deformability make silicones functionally unsuitable for such applications given that even low-level forces would readily overcome and deform such silicone lenses. Issues, such as optical misalignment or internal damage, can thus occur.

In the case of large silicone-based optics, where silicone must span large areas, the additional issues associated with mechanical deformation must also be addressed in order to make silicone practical for large lenses, which otherwise would deform under various forms of pressure, mechanical load, vibration or simply the impact of gravity.

To address these issues with optical silicone, and to reap the many benefits of the optical silicone lenses, the optical-blocking barriers 112, 114, 212 incorporated into the unitary multi-optic systems 100, 200 disclosed herein also act as structural mechanical reinforcement when the optic material is optical silicone. The optical-blocking barriers 112, 114, 212 overcome the mechanical limitations of the optical silicone, enabling its use in the unitary multi-optic systems 100, 200. The placement of the suitable insert-molded/co-molded optical-blocking barriers impart the silicone lens with sufficient mechanical strength so as only limited localized, acceptable deformation would take place. Given the superior shape memory associated with silicone, the lens would revert to its original un-deformed geometry once the external pressure is relieved, thereby allowing the use of optical silicone as an outer lens for such applications as, but not limited to, outer vehicular headlamps, tail lamps, signal lamps, auxiliary lamps as well as a myriad of non-automotive lighting applications in industry, transportation, construction, security as well as multiple illumination and signalization fields. Furthermore, the unitary multi-optic systems herein made with optical silicone would require no UV coating and no hard coating on light emitting surfaces to avoid damage.

Figure 3A:
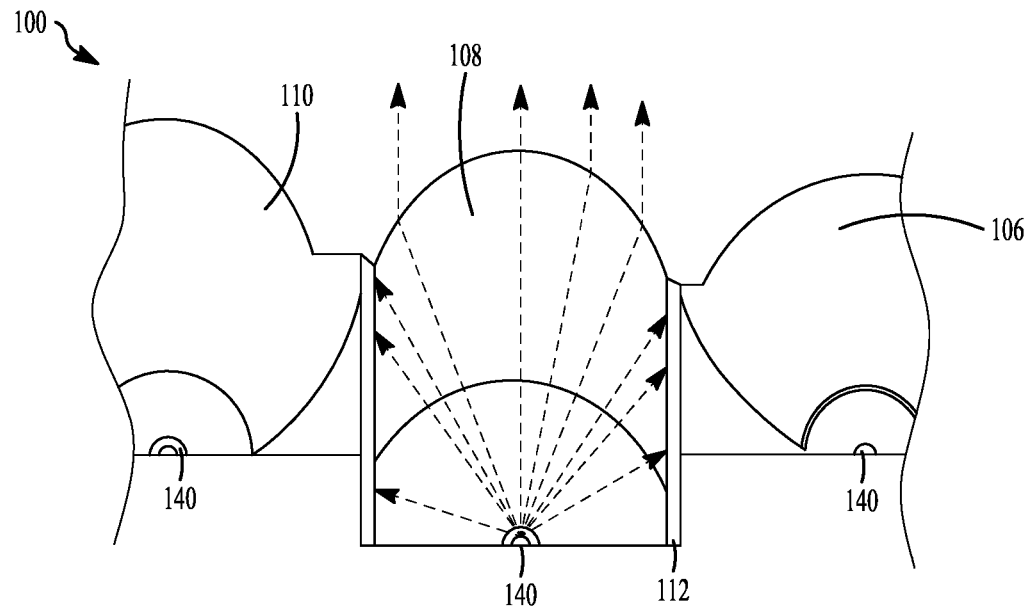
FIG. 3A is a partial plan view of FIG. 1A including the radiation/light source and pattern.

Returning back to the figures, FIG. 3A is a plan view cross-section of the illustration in FIG. 1A illustrating the configuration of the primary low beam optic 106, the secondary low beam optic 108, and the high beam optic 110 of the unitary multi-optic system 100. In this particular illustration, the individual optic prescriptions are aimed to achieve a legally constrained photometric output. The radiation/light sources 140 are indicated for each illustrated optic.

Figure 3B:
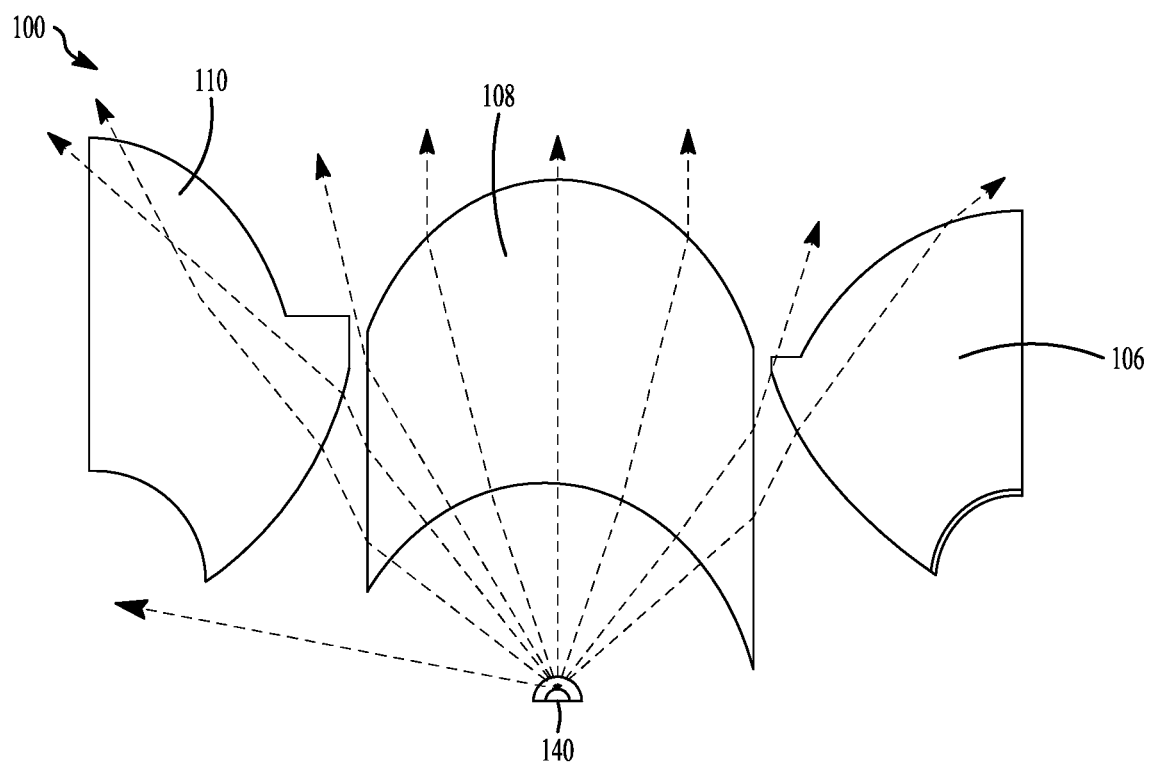
FIG. 3B is the partial plan view of FIG. 3A but without the optical-blocking barriers, illustrating the stray light contamination.

FIG. 3B illustrates a similar plan view section as that of FIG. 3A, except that in FIG. 3B, only the co-molded optics are present. There are no optical-blocking barriers in this example. FIG. 3B includes the radiation/light source 140 for optic 108. Reference 150 illustrates the useful emissions from source 140, which enter optic 108 and provide the intended optical input to achieve the desired optical performance for optic 108. Conversely, references 152 and 154 illustrate the pathway by which uncontrolled emissions associated with source 140 enters and impinges on the adjacent optics 106, 110 in an uncontrolled, undesired manner. The emissions may be produced by a multiplicity of sources in a variety of wavelengths, whether in the visible domain or not, examples of sources 140 including but not limited to, LEDs, laser emitters, optically-piped systems, halogen, High Intensity Discharge (HID)/xenon, tungsten, etc.

In the illustration in FIG. 3B, as the optical requirements for optic 110 make its optical collection efficiency (i.e., the amount of useful light collected by the optic and rendered onto effective, useful optical output) quite low, less than 50%, a substantial amount of radiation energy thus impinges on the adjacent optics resulting in uncontrolled light being harnessed and emitted by these optics as undesired optical output. In this particular example a legal threshold of 125 candela is assigned to an objective glare value, the maximum intensity allowable for this particular optic at this particular objective test point/criteria, in this case a low beam headlamp. The optical impact associated with the uncontrolled radiation 152 emanating from the source 140 illuminating optic 108, then entering optic 110 and optic 106, then exiting these adjacent optics as uncontrolled radiation. Furthermore, additional uncontrolled light is transmitted between the optics in the areas where these are conjoined, where commonly molded sections abut to each other (see reference 154) allowing further uncontrolled light to be transmitted between the adjacent as well as further afield-positioned optics forming part of the unitary optical system depicted without the optical-blocking barriers. Stray light thus has multiple pathways to bleed into and penetrate the various adjoining optical elements. Output results in the glare measurement for this particular example exceed 3500 candela, hence significantly beyond the legal criteria allowed by law, thereby illustrating that the outlined unitary optical construction, absent the embodiments of the unitary multi-optic system as disclosed, is neither practical nor feasible in most such applications.

Similar optical interactions exist between all the conjoined elements depicted in this example, which comprises of multiple optical prescriptions, which must meet specific optical performance objectives to either fulfill requirements or legal guidelines. Effectively, illuminating any single or multiple function will entail stray light to enter the adjacent optical elements and thereby adversely impacting the effective intended performance of each specific optic and/or optical system. Such constraints illustrate how those skilled in the art of optics do not consider conjoined optics, particularly those of dissimilar nature, as a practical approach. Effectively, the industry typically employs a single or multiple set of optics when these optics contribute to achieve a single optical pattern via the additive contribution of multiple individual sub-optics. In such applications, where interference from uncontrolled light bleed between adjacent optical elements is considered acceptable and/or manageable, multiple co-molded optical elements represent a practical solution yet, as evidenced by the example of FIG. 3B, diverse conjoined optical prescriptions is not practical in use for many applications.

Figure 3C:
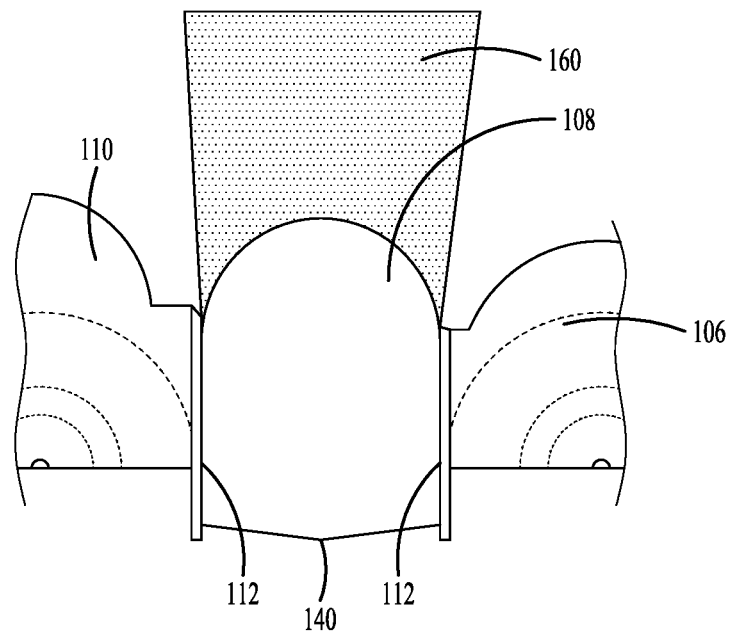
FIG. 3C is the partial plan view of FIG. 3A with the optical-blocking barriers in the unitary multi-optic systems disclosed herein, illustrating the focused emission pattern.

FIG. 3C is an illustration of the light distribution associated with the light/radiation source 140 linked with optic 108 according to the embodiments of the unitary multi-optic systems disclosed herein, illustrating the effect of the optical-blocking barriers 112. FIG. 3C illustrates how a conjoined optical system can be produced so that each individual prescription operates as optically intended, without unwanted, performance altering radiation reaching adjacent optical elements. FIG. 3C illustrates how the optical-blocking barriers 112 effectively block cross-linking of light from penetrating adjacent optics, whether via airborne or through internally transmitted light or radiation beams 160 where the optics are conjoined. The uncontrolled glare produced without the optical-blocking barriers illustrated in FIG. 3B is eliminated, enabling the optic to perform as a stand-alone optical entity unburdened by stray radiation outputs resulting from uncontrolled emissions associated with adjacent or nearby optical elements. This illustration exemplifies how the unitary multi-optic systems disclosed herein can fulfill optical performance objectives via allowing each optic to perform as intended without undesired input or interference from other nearby optic prescription or features, enabling use of co-molded prescription optics even in regulated applications.

An example application of the unitary multi-optic systems disclosed herein are vehicle exterior lamps. A vehicle exterior lamp as disclosed herein comprises the unitary multi-optic system with two or more co-molded individual optics molded such that each individual optic is adjacent at least one other individual optic, each individual optic configured to be illuminated with a respective individual radiation source. An optical-blocking barrier is integrally molded with the individual optics and configured to prevent transmission of undesired source emissions between the two or more co-molded individual optics. The lamp further has a light source associated with each co-molded individual optic and a housing configured to attach the unitary multi-optic system to an exterior of the vehicle.

As previously noted, optical silicone has many advantages over conventional plastic lenses. The shape memory following the stretching and bending of silicone material makes it practical to mold undercuts and other such features, which are either not practical with harder plastics or require the use of complex tool action in order to physically extract the molded component without damaging the parts. Another advantage is the near-imperviousness of optical silicone to UV exposure inasmuch as UV is not absorbed by the silicone, and so does not affect its properties over long periods of time. Yet another advantage is its resistance to damage from stones, gravel, etc. that typically score, scratch and other damage conventional plastic lenses.

However, the rubber-like flexibility renders large or thin lenses prone to deformation due to external forces such as gravity, external mechanical pressure, aerodynamic pressure, vibrations, etc. In general, while optical silicone can be effectively molded to thicknesses significantly thinner than is practical for common hard plastic optical materials, such as PC and PMMA, the low mechanical strength of silicone makes it impractical for applications such as external lamp lenses, subject to a multiplicity of external forces, which would result in undesired lens deformations. The embodiments illustrated in FIGS. 4-7 impart structural strength to thin lens materials made with optical silicone and other soft hardness materials that may be used to produce lamp lenses.

A conventional plastic lens is generally molded in thicknesses ranging from 2.50 mm to 3.00 mm, the lower figure representing a typical practical lower molding as well as mechanical strength limits of such optical plastics. Optical silicone can be molded as thin as 0.127 mm in cross section thickness, considerably thinner than its plastic counterparts.

Figure 4:
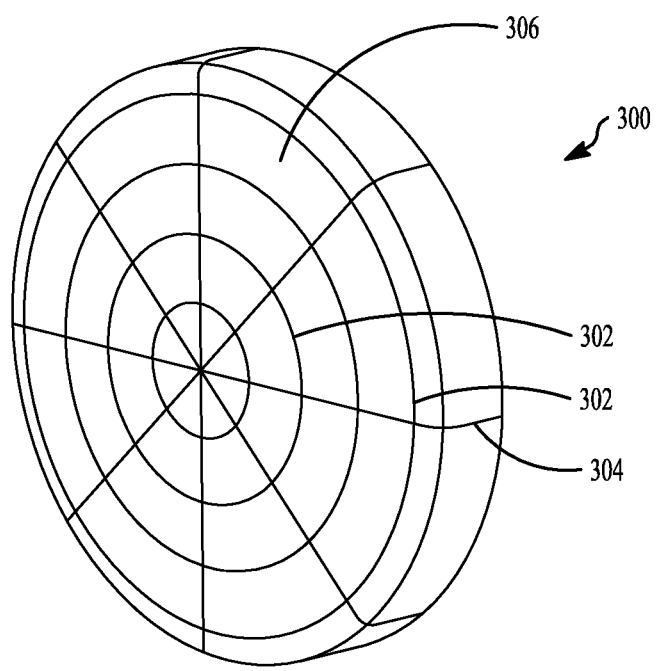
FIG. 4 is a front perspective view of a optical silicone lens with a reinforcing grid as disclosed herein.

FIG. 4 illustrates a thin optical lens 300. As a non-limiting example, the lens 300 may be a round vehicular lamp lens, such as a 7" headlamp. The optical lens 300 is internally reinforced by a suitable mechanically strong reinforcing grid 302 which is insert molded within as well as fully captured within the silicone material rendering a final single, unitary lens. A grid extension 304 provides means to mechanically link the reinforcing grid to the lamp housing so as to provide a high degree of structural stability along with strength. The reinforcing grid 302 spans a main body 306 of the optical lens 300 to support the entirety of the optical lens 300 due to its thin constructions. The reinforcing grid 302 may be constructed from a variety of known materials, such as, but not limited to, thin wires, molded plastics, cast or molded metals, metal stampings and the like.

Figure 5A:
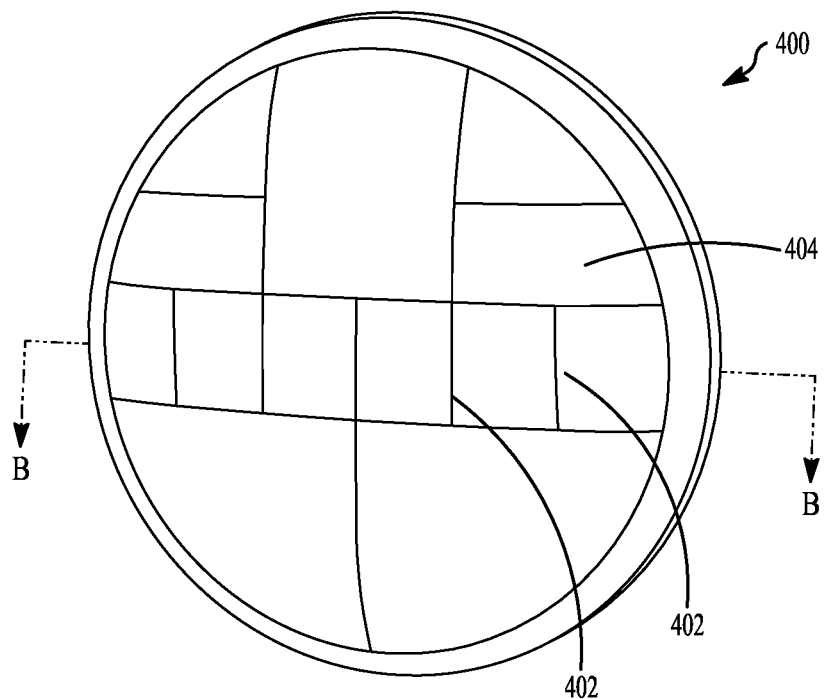
FIG. 5A is a front perspective view of another optical silicone lens with a reinforcing grid as disclosed herein.
Figure 5B:
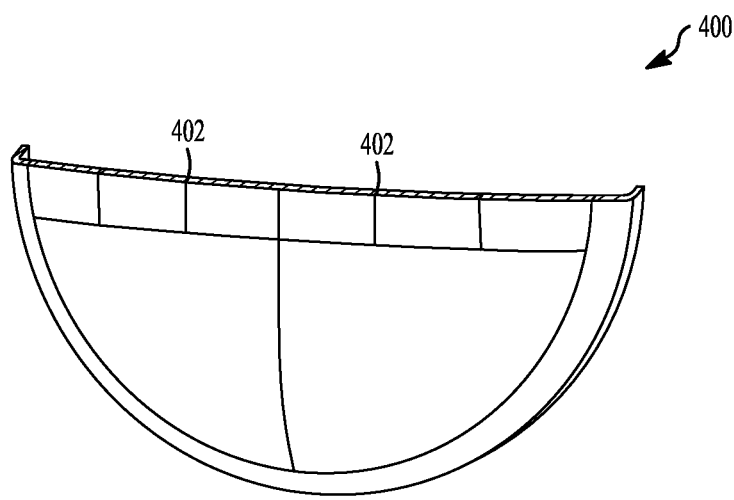
FIG. 5B is a cross-section view of FIG. 5A along line B.

FIG. 5A illustrates a front perspective view of another lens 400 with an alternative reinforcing grid 402. The reinforcing grid 402 spans a main body 404 of the optical lens 400 to support the entirety of the optical lens 400 due to its thin constructions. In FIG. 5A, the reinforcing grid 402 is in a different configuration that is provided as an example only. The reinforcing grids 302, 402 can be of any design that provides sufficient structural support to the lens and may be selected based on aesthetics or other reasons. The reinforcing grid 302, 402 does not impact the performance of the lamp, whether prescription or not, due to the thinness of the grid material and its embeddedness. FIG. 5B is a cross section of FIG. 5A along line B.

Figure 6:
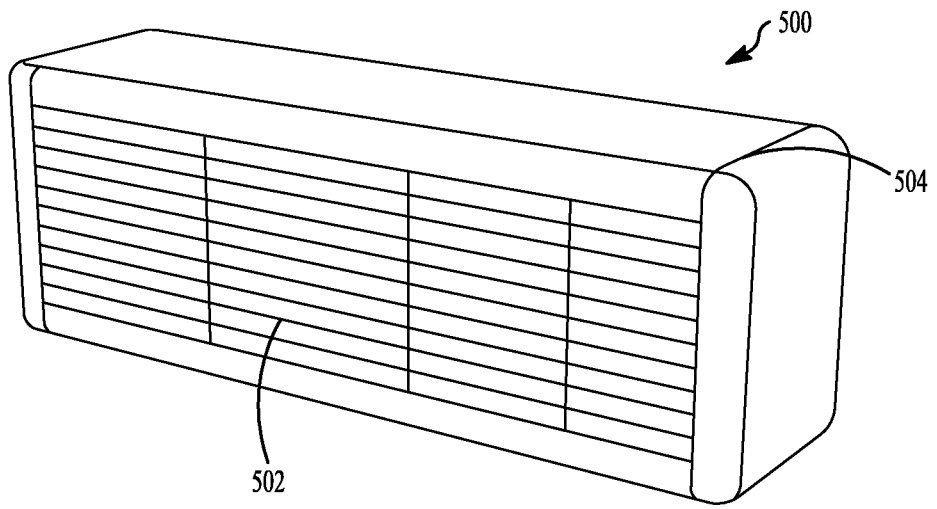
FIG. 6 is a front perspective view of another optical silicone lens with a reinforcing grid as disclosed herein.

FIG. 6 illustrates yet another non-limiting example of a lens 500 having a different geometry and having the internally imbedded reinforcing grid 502 and structural grid extensions 504. The lamp lens disclosed herein can be used with one or more light/radiation (illumination) sources and can be used in non-prescription applications.

Figure 7:
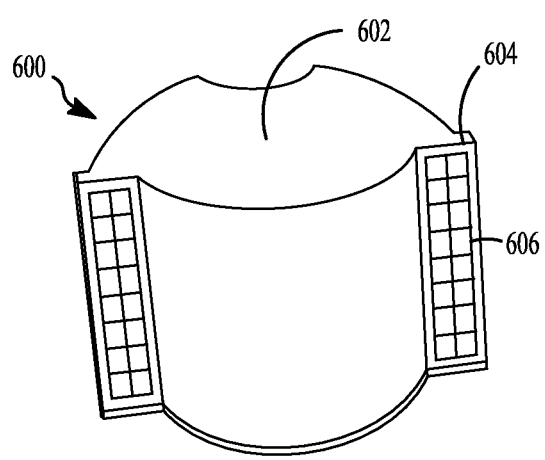
FIG. 7 is a front perspective view of another embodiment of an optical silicone lens with a reinforcing grid as disclosed herein.

FIG. 7 illustrates another embodiment of an optic lens 600 formed of a silicone material. In this embodiment, the lens element includes a first portion 602 and a second portion 604, the second portion 604 having a smaller thickness than the first portion 602. The reinforcing grid 606 is only included in the second portion 606 due to the thinness of the second portion 604. The first portion 602 is of a thickness that does not require the reinforcing grid 606. The optical lens 600 is internally reinforced by the suitable mechanically strong reinforcing grid 606 which is insert molded within as well as fully captured within the silicone material rendering a final single, unitary lens. The shape of the first and second portions 602, 604, as well as the design of the reinforcing grid 606, are provided as examples and are non-limiting.

A growing trend within the automotive lighting field is to implement heating functions within lenses in order to cope with ice, frost and snow build-up on LED as well as other types of lighting devices. While traditional incandescent and halogen light sources tend to emit considerable amounts of radiant thermal energy, which oftentimes proves sufficient to melt snow, frost and ice to a level considered acceptable to maintain a suitable level of intended functionality and performance, LED light sources usually emit low levels of energy insufficient to accomplish a sufficient degree of defrosting and/or melting of ice, frost or snow, thereby leading to undesired build-up of ice, snow or frost, which effectively compromises the lamp light output and performance, oftentimes to levels significantly compromising performance and, in the case of vehicular and other applications, compromising safety. This issue is also associated with LED traffic lights, which unlike their incandescent technology predecessors, do not emit sufficient thermal emissions to accomplish effective ice, snow and frost melting resulting in many cases with the total blockage of the light signal in question.

Heating devices on LED headlamps with plastic lenses are available. The heating devices are incorporated onto the outer lamp plastic lenses via a variety of methods, such as adhesively applied heating grids to the inside of the outer lenses, grids printed onto suitable sheet materials then over-molded to form and outer lens, and wires partially melted onto the inside surface of the outer lens. However, conventional clear plastics are only temperature resistant up to around 100° C. For example, PC is temperature resistant to about 120° C. and PMMA is temperature resistant up to about 90° C.

As previously noted, optical silicone enjoys the added advantage of significantly higher temperature resistance than conventional clear plastics commonly employed for lighting applications. Silicones are usually rated to remain thermally stable to temperatures in the area of 200° C., which is nearly double that of traditional optical grade plastics. The higher temperature resistance provides the opportunity to use higher temperature heating elements to more rapidly defrost, de-ice and remove snow.

Figure 8:
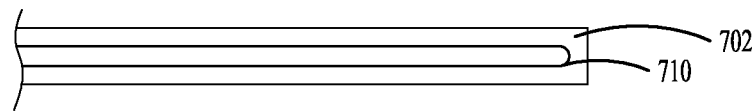
FIG. 8 is a partial plan view of a reinforcing grid with a heating element as disclosed herein.

Although the conventional heating elements that are used with plastic lenses can be used with optical silicone lenses, the structural issues are not resolved with the heating elements, as they do not impart sufficient rigidity and mechanical support to the optical silicone. Accordingly, as disclosed herein, the reinforcing grids 302, 402, 502 in FIGS. 4-7 can be designed to function as a heating element to provide heat to the lens for removal of snow, frost, ice, etc., while still providing the structural support required for the thin lens. The reinforcing grids can be the heating element, made with sufficient mechanical strength to impart the structural support required by the optical silicone lens. Alternative, the reinforcing grids can be carriers for the heating element, with the heating element adhesively applied to the reinforcing grids, printed onto suitable sheet materials that are adhered to the reinforcing grids, printed to the reinforcing grids directly, or partially melted onto the surface of the reinforcing grid. The heating element can be energized through the application of electrical energy, leading to the internal heating of the element, which when conductively transmitted through the silicone lens, would result in the temperature of the lens rising above the melting point of ice, snow and frost. FIG. 8 is a non-limiting illustration of a reinforcing grid 702 carrying a heating element 710, shown as a wire.

It is further contemplated that the optical-blocking barriers in FIGS. 1-2 can be heating elements or heating element carriers, utilizing all barrier surfaces, some barrier surfaces, partial areas of all surfaces, or partial areas of some surfaces, for example.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A unitary multi-optic system for a vehicle, comprising:
two or more co-molded individual optics molded from optical silicone such that each individual optic is adjacent at least one other individual optic, each individual optic configured to be illuminated with a respective radiation source; and
an optical-blocking barrier integral with the individual optics and configured to interfere with transmission of undesired source emissions between the two or more co-molded individual optics,
wherein the two or more co-molded individual optics are headlamps, tail lamps or fog lamps of the vehicle.

2. The unitary multi-optic system of claim 1, wherein the optical-blocking barrier is positioned between adjacent individual optics.

3. The unitary multi-optic system of claim 2, wherein the optical-blocking barrier extends beyond a rear surface of one or both of the adjacent individual optics.

4. The unitary multi-optic system of claim 1, wherein the optical-blocking barrier surrounds an entire perimeter of each individual optic.

5. The unitary multi-optic system of claim 4, wherein the optical-blocking barrier extends beyond a rear surface of one or both of the adjacent individual optics.

6. The unitary multi-optic system of claim 1, wherein each of the two or more co-molded optics has a different headlamp prescription or a different tail lamp prescription.

7. The unitary multi-optic system of claim 1, wherein each of the two or more co-molded optics has a same headlamp or a same tail lamp prescription.

8. The unitary multi-optic system of claim 1, wherein each of the two or more co-molded optics has a headlamp prescription, the headlamp prescription producing a side-emitting light optic, a turn signal optic, a primary low beam optic, a secondary low beam optic, a primary high beam optic, a supplemental high beam optic, or a fog lamp optic.

9. The unitary multi-optic system of claim 1, wherein each of the two or more co-molded optics has a tail lamp prescription, the tail lamp prescription producing a rear position optic, a brake optic, a reverse optic, a side-emitting light optic, a fog lamp optic, or a turn signal optic.

10. The unitary multi-optic system of claim 1, wherein the optical-blocking barrier provides structural, mechanical support to the optical silicone.

11. The unitary multi-optic system of claim 1, wherein the two or more co-molded individual optics have no coatings on a light emitting surface.

12. The unitary multi-optic system of claim 1, wherein the optical-blocking barrier is also a heating element.

13. The unitary multi-optic system of claim 1, further comprising a heating element carried by the optical-blocking barrier and configured to generate heat additional to any generated from the respective individual radiation source.

14. A unitary multi-optic system for a vehicle, comprising:
two or more co-molded individual optics molded from optical silicone such that each individual optic is adjacent at least one other individual optic, each individual optic configured to be illuminated with a respective radiation source, the two or more co-molded individual optics configured as headlamps for the vehicle or tail lamps or fog lamps for the vehicle; and
an optical-blocking barrier positioned between adjacent individual optics and configured to separate entire adjacent surfaces of the adjacent individual optics to prevent transmission of undesired source emissions between the adjacent individual optics.

15. The unitary multi-optic system of claim 14, wherein each of the two or more co-molded individual optics is individually a turn signal lamp, low beam lamp, high beam lamp, signal lamp, side lighting lamp, auxiliary lamp, positional lamp, brake lamp and fog lamp.

16. The unitary multi-optic system of claim 14, wherein the optical-blocking barrier has a height and a depth, the height being equal along an entirety of the depth.

17. The unitary multi-optic system of claim 14, wherein each individual optic has a front side and a rear side with a perimeter of each individual optic extending therebetween, the optical-blocking barrier surrounding an entire perimeter of each individual optic.

18. The unitary multi-optic system of claim 14, wherein the optical-blocking barrier provides structural, mechanical support to the optical silicone.

* * * * *